(12) United States Patent
Yang

(10) Patent No.: US 10,047,994 B2
(45) Date of Patent: Aug. 14, 2018

(54) REFRIGERATOR AND METHOD FOR ASSEMBLING ICE MACHINE THEREOF

(71) Applicant: Dongbu Daewoo Electronics Corporation, Seoul (KR)

(72) Inventor: Sung Jin Yang, Seoul (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 362 days.

(21) Appl. No.: 14/838,210

(22) Filed: Aug. 27, 2015

(65) Prior Publication Data
US 2016/0370055 A1 Dec. 22, 2016

(30) Foreign Application Priority Data
Jun. 16, 2015 (KR) .................. 10-2015-0085076

(51) Int. Cl.
| F25C 1/04 | (2018.01) |
| F25C 1/24 | (2018.01) |
| B23P 15/26 | (2006.01) |
| F25D 11/00 | (2006.01) |

(52) U.S. Cl.
CPC ............. *F25C 1/04* (2013.01); *B23P 15/26* (2013.01); *F25C 1/24* (2013.01); *F25D 11/00* (2013.01); *F25C 2400/10* (2013.01); *F25C 2500/02* (2013.01)

(58) Field of Classification Search
CPC .......... F25C 1/04; F25C 1/24; F25C 2400/10; F25C 2500/02; F25D 11/00; B23P 15/26
See application file for complete search history.

(56) References Cited

U.S. PATENT DOCUMENTS

| 2,799,144 A * | 7/1957 | Barton ................ F25C 1/04 62/137 |
| 2009/0260371 A1 | 10/2009 | Kuehl et al. |
| 2011/0162406 A1 | 7/2011 | Shin et al. |
| 2012/0090346 A1* | 4/2012 | Mitchell ............... F25C 5/22 62/340 |
| 2012/0304676 A1 | 12/2012 | White et al. |

(Continued)

FOREIGN PATENT DOCUMENTS

| JP | 2006-38331 | 2/2006 |
| JP | 2007-155298 A | 6/2007 |

(Continued)

OTHER PUBLICATIONS

European Search Report dated Oct. 12, 2016 issued in corresponding European Patent Application No. 5187265.2.

*Primary Examiner* — Emmanuel Duke

(57) ABSTRACT

A refrigerator includes a main body configured to have a storage space for storing food, a cooling part provided in the main body and comprising a compressor, a condenser, an expansion valve, and an evaporator which constitute a cooling/freezing cycle, a refrigerant pipe for circulating refrigerant based on the refrigerating cycle, and an ice machine in the storage space. The ice machine includes a case providing an ice-making space, an ice-making pipe extending from the refrigerant pipe to the case, a cooling plate on a surface of the case and configured to be in contact with the ice-making pipe, and an ice-making tray on the cooling plate so as to be cooled by the cooling plate, and configured to accommodate water for generating ice.

7 Claims, 4 Drawing Sheets

(56) References Cited

U.S. PATENT DOCUMENTS

| | | | |
|---|---|---|---|
| 2013/0167569 A1* | 7/2013 | Lee | F25C 5/002 62/129 |
| 2013/0167575 A1 | 7/2013 | Hong et al. | |
| 2013/0298404 A1 | 11/2013 | An et al. | |
| 2016/0245574 A1 | 8/2016 | Jeong et al. | |

FOREIGN PATENT DOCUMENTS

| | | |
|---|---|---|
| JP | 2010-112569 A | 5/2010 |
| KR | 10-0164756 B1 | 1/1999 |
| KR | 10-2005-0110214 | 11/2005 |
| KR | 10-2011-0080104 A | 7/2011 |
| KR | 10-2013-0078531 A | 7/2013 |
| KR | 10-1502112 | 3/2015 |
| KR | 10-2015-0044308 A | 4/2015 |

\* cited by examiner

REFRIGERATOR AND METHOD FOR ASSEMBLING ICE MACHINE THEREOF

CROSS-REFERENCE TO RELATED APPLICATION

This application is based on and claims priority to Korean Patent Application No. 10-2015-0085076, filed on Jun. 16, 2015, the disclosure of which is incorporated herein in its entirety by reference.

FIELD OF THE INVENTION

Embodiments according to the present invention relate to a refrigerator, and more particularly, to a refrigerator and a method for assembling an ice machine of a refrigerator.

BACKGROUND

A refrigerator is a device for storing food in a low temperature state and may be configured to be able to preserve food in a frozen state or in a cool state according to the kind of the food that a user wants to store. The inside of the refrigerator is cooled by continuously supplied cold air, in which the cold air is continuously generated by heat exchange with refrigerant according to a cooling cycle that includes compression, condensation, expansion, and evaporation processes. The cold air supplied to the inside of the refrigerator is evenly transferred to the inside of the refrigerator by convection so as to store food in the refrigerator at a desired temperature.

Generally, the main body of the refrigerator has a rectangular parallelepiped shape of which the front surface is open, and inside the main body may be a refrigerating compartment and a freezing compartment. Further, the front surface of the main body may be provided with a refrigerating room door and a freezing room door, and a storage space in the refrigerator may be provided with multiple drawers, shelves, receiving boxes, etc., in which various foods may be stored in an optimal condition.

Traditionally, a top mount type of refrigerator, which has a freezing compartment positioned at an upper portion thereof and a refrigerating compartment positioned at a lower portion thereof, has been mainly used. Recently, however, in order to increase convenience for users, a bottom freezer type of refrigerator having a freezing compartment positioned at a lower portion thereof has come into the market. In the case of the bottom freezer type of refrigerator, the refrigerating compartment, which may be more frequently used, is positioned at an upper portion thereof, and the freezing compartment, which may be relatively less frequently used, is positioned at a lower portion, so that a user can conveniently use the refrigerating compartment. However, since the freezing compartment is positioned at the lower portion, the bottom freezer type of refrigerator has a problem in that a user bends his/her back to open the freezing room door and take out items such as ice.

In order to solve such a problem, a refrigerator in which a dispenser for taking out ice is provided at or in a refrigerating compartment door positioned at an upper portion of a bottom freezer type of refrigerator has recently come into the market. In this case, an ice machine for generating ice may be provided on the inside of the refrigerating compartment door or inside the refrigerating compartment itself.

The ice-making schemes of ice machines are classified into an indirect cooling type and a direct cooling type. According to the indirect cooling type, cold air is supplied from an ice machine, an ice-making tray is cooled by forced convection, and thus ice is made from water. According to the direct cooling type, a refrigerant pipe is in contact directly with an ice-making tray or water, so that ice is made. The indirect cooling type is slower than the direct cooling type; the conventional direct cooling type of ice-making scheme is faster than the indirect cooling type of ice-making scheme. However, according to the conventional direct cooling type of ice-making scheme, since a refrigerant pipe is disposed in an ice-making compartment, the structure of the ice-making compartment is complex, the manufacturing process thereof is difficult, and installation of the refrigerant pipe in the ice-making compartment is difficult. Such a difficult manufacturing process reduces productivity, and causes an increase in refrigerator manufacturing costs. In addition, when a refrigerant pipe is disposed inside an ice-making compartment, the storage capacity of the ice-making compartment is reduced by the volume of the pipe.

SUMMARY OF THE INVENTION

In view of the above, embodiments according to the present invention provide a refrigerator using a direct cooling type ice-making scheme that has a refrigerant pipe disposed outside an ice-making compartment, thereby improving ice-making speed and the amount of ice, and making the ice machine more compact.

In accordance with an aspect of the present invention, a refrigerator includes: a main body configured to have a storage space for storing food; a cooling system in the main body, and configured to include a compressor, a condenser, an expansion valve, and an evaporator which constitute a cooling/freezing cycle; a refrigerant pipe for circulating refrigerant based on the cooling/freezing cycle; and an ice machine in the storage space, where the ice machine includes: a case providing an ice-making space; an ice-making pipe extending from the refrigerant pipe to a side of the case; a cooling plate on a surface of the case and configured to be in contact with the ice-making pipe; and an ice-making tray on the cooling plate so as to be cooled by the cooling plate, and configured to accommodate water for generating ice.

The ice-making tray may be made of a material having high heat conductivity.

The ice-making tray may include a plurality of heat exchange ribs at a lower portion of the tray.

The refrigerator may further include a heater part in a space between an upper surface and a lower surface of the ice-making tray.

The cooling plate may include a pipe accommodation groove for accommodating the ice-making pipe, and guide ribs formed at both sides of the pipe accommodation groove; and the ice-making tray may include, on an upper surface and a lower surface thereof, guides into which the guide ribs are respectively inserted.

The cooling plate may include a pipe accommodation groove for accommodating the ice-making pipe, and guides formed at both sides of the pipe accommodation groove; and the ice-making tray may include, on an upper surface and a lower surface thereof, guide ribs which are inserted into the guides, respectively.

A portion of the pipe accommodation groove may be sealed by a sealing agent.

In accordance with another aspect of the present invention, a method for assembling an ice machine of a refrigerator includes: extending an ice-making pipe, operable for circulating cold air from a refrigerant pipe for circulating refrigerant based on a cooling/freezing cycle, to a case of the ice machine; installing a cooling plate, which is in contact with the ice-making pipe and is cooled, on a surface of the case; and assembling an ice-making tray, which accommodates water for generating ice, on the cooling plate.

The method may further include: forming the cooling plate to have a pipe accommodation groove for accommodating the ice-making pipe and to have guide ribs at both sides of the pipe accommodation groove; and forming an upper surface and a lower surface of the ice-making tray to have guides into which the guide ribs are respectively inserted.

The method may further include: forming the cooling plate to have a pipe accommodation groove for accommodating the ice-making pipe and to have guide holes at both sides of the pipe accommodation groove; and forming an upper surface and a lower surface of the ice-making tray to have guide ribs which are inserted into the guides, respectively.

The assembling step may include assembling the ice-making tray on the cooling plate in a sliding way.

The method may further include sealing a portion of the pipe accommodation groove with a sealing agent.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof. In the following description, a detailed description of known functions and configurations incorporated herein will be omitted when it may obscure the subject matter of the present invention.

Figure 1:
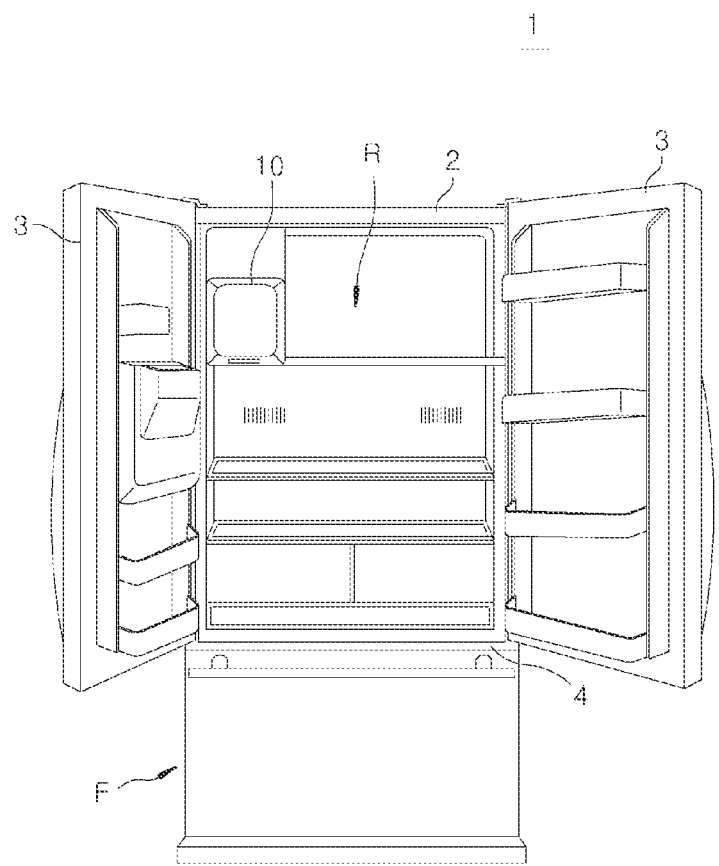
FIG. 1 is a front view of a refrigerator in accordance with an embodiment of the present invention.

FIG. 1 is a front view of a refrigerator in accordance with an embodiment of the present invention.

A refrigerator 1 illustrated according to the embodiment of the present invention may include: a main body 2 configured to form an outer appearance; a barrier 4 configured to partition a food storage space formed inside the main body 2 into an upper-side refrigerating compartment R and a lower-side freezing compartment F; a refrigerating compartment door 3 provided (attached) on both side edges of a front surface of the main body 2, and configured to selectively open and close the refrigerating compartment R by rotary motion; and a freezing compartment door 5 configured to open/close a front-surface opening portion of the freezing compartment F. Although the embodiment shows an example where an ice machine 10 is at one side of an upper portion of the refrigerating compartment R, this is illustrative only, and the ice machine 10 may be provided at another position, such as another position in the refrigerating compartment R or on the refrigerating compartment door. The refrigerator 1 in accordance with an embodiment of the present invention includes: a cooling section or system (not shown) including a compressor, a condenser, an expansion valve, and an evaporator, which is configured to perform a cooling/freezing cycle; and a refrigerant pipe 20 extending to one side of the ice machine and configured to provide refrigerant for ice making. Refrigerant can move through the refrigerant pipe 20 based on a cooling/freezing cycle.

Figure 2:
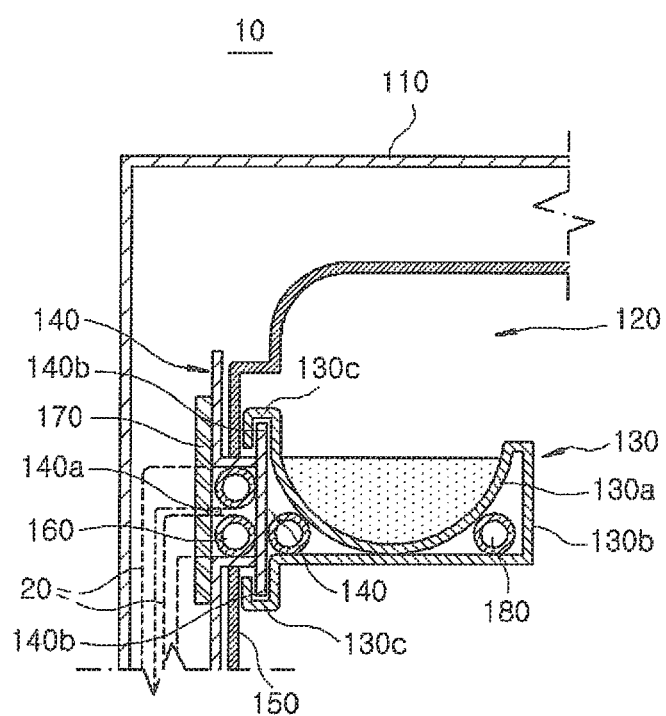
FIG. 2 is a cross-sectional view of an ice-making machine of the refrigerator in accordance with an embodiment of the present invention.

FIG. 2 is a cross-sectional view of the ice machine 10 of the refrigerator 1 in accordance with an embodiment of the present invention.

In accordance with an embodiment of the present invention, the ice machine 10 of the refrigerator 1 includes a case 110 for providing an ice-making space 120, an ice-making pipe 160 extending from one point of the aforementioned refrigerant pipe 20 to one side of the case 110 of the ice machine 10, a cooling plate 140 provided on one surface of the case 110 and configured to be in contact with the ice-making pipe 160, and an ice-making tray 130 mounted on the cooling plate 140 and configured to accommodate and cool (freeze) water to generate ice. The cooling plate 140 may constitute a part of one side wall 150 of the ice-making space 120. The cooling plate 140 may have a pipe accommodation groove 140a for accommodating the ice-making pipe 160, and guide ribs 140b for guiding the ice-making tray 130 in both directions of the pipe accommodation groove 140a. In this case, one side portion (e.g., the upper portion) of the ice-making tray 130 may be formed in an open shape, and guides 130c may be formed at the edge parts, respectively, of the upper surface 130a forming the one side portion which is open and the lower surface 130b. When the ice-making tray 130 is placed into the ice-making space 120, the guide ribs 140b provided at the cooling plate 140 are respectively inserted into the guides 130c provided at the open side portion of the ice-making tray 130, and thus the ice-making tray 130 of the refrigerator according to the embodiment can be coupled with the cooling plate 140, e.g., in a way that allows the tray to slide.

The above describes an embodiment in which the guide ribs 140b are provided at the cooling plate 140 and the guides 130c are provided at the ice-making tray 130. Alternatively, guides are provided at the cooling plate 140, and guide ribs are provided at the ice-making tray 130, also allowing the ice-making tray 130 to be coupled to the cooling plate 140 in a way that allows it to slide.

Since the ice-making tray 130 and the cooling plate 140 coupled in a sliding manner according to the aforementioned configurations are in a structure in which the cooling plate 140 is at the side surface of the ice-making tray 130, cold air in the ice-making pipe 160 in the pipe accommodation groove 140a of the cooling plate 140 can be transferred directly to the ice-making tray 130 via the cooling plate 140. In this case, the ice-making tray 130 may be made of a material, such as aluminum, having a high heat conductivity in order to increase the ice-making efficiency of the ice-making tray 130, and the lower portion of the ice-making tray 130 may be provided with a plurality of heat exchange ribs to increase an area in contact with air to further improve the heat exchange performance. In addition, the pipe accommodation groove 140a of the cooling plate 140 may be sealed with a sealing agent 170, such as urethane, so that cold air in the ice-making pipe 160 cannot be lost to the outside and can be transferred to the ice-making tray 130 via the cooling plate 140.

In accordance with an embodiment of the present invention, the ice machine 10 of the refrigerator 1 may be provided, between the upper surface 130a and lower surface 130b of the ice-making tray 130, with a heater part 180 (e.g., a duct or tube) which is made of a material, such as aluminum, having a high heat conductivity so as to transfer heat from a heater (not shown) to a lower part of the ice-making tray 130 and thus prevent the ice-making tray 130 from being covered with frost.

Figure 3:
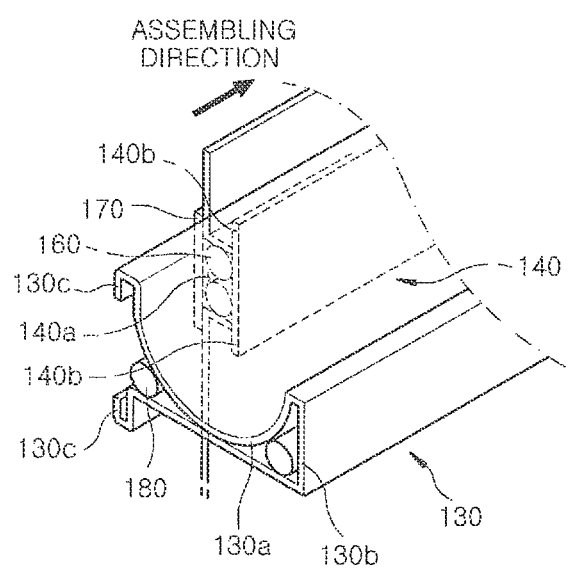
FIG. 3 is a perspective view illustrating an assembled state of an ice-making machine of the refrigerator in accordance with an embodiment of the present invention.

FIG. 3 is a perspective view illustrating an assembled state of the ice machine 10 of the refrigerator 1 in accordance with an embodiment of the present invention.

The embodiment illustrated in FIG. 3 shows an example in which, when the ice-making tray 130 is placed at (e.g., pushed to) the inside of the ice-making space 120 from outside of the ice-making space 120, the guides 130c formed on one side portion of the ice-making tray 130 accommodate the corresponding guide ribs 140b, respectively, of the cooling plate 140, and the guides 130c are engaged with the guide ribs 140b, so that the ice-making tray 130 is coupled to the cooling plate 140 in a sliding manner. According to the embodiment illustrated in FIGS. 2 and 3, the ice-making pipe 160 is disposed outside the ice-making space 120, so that the inside of the ice-making space 120 is not complex and thus workability can be improved.

Figure 4:
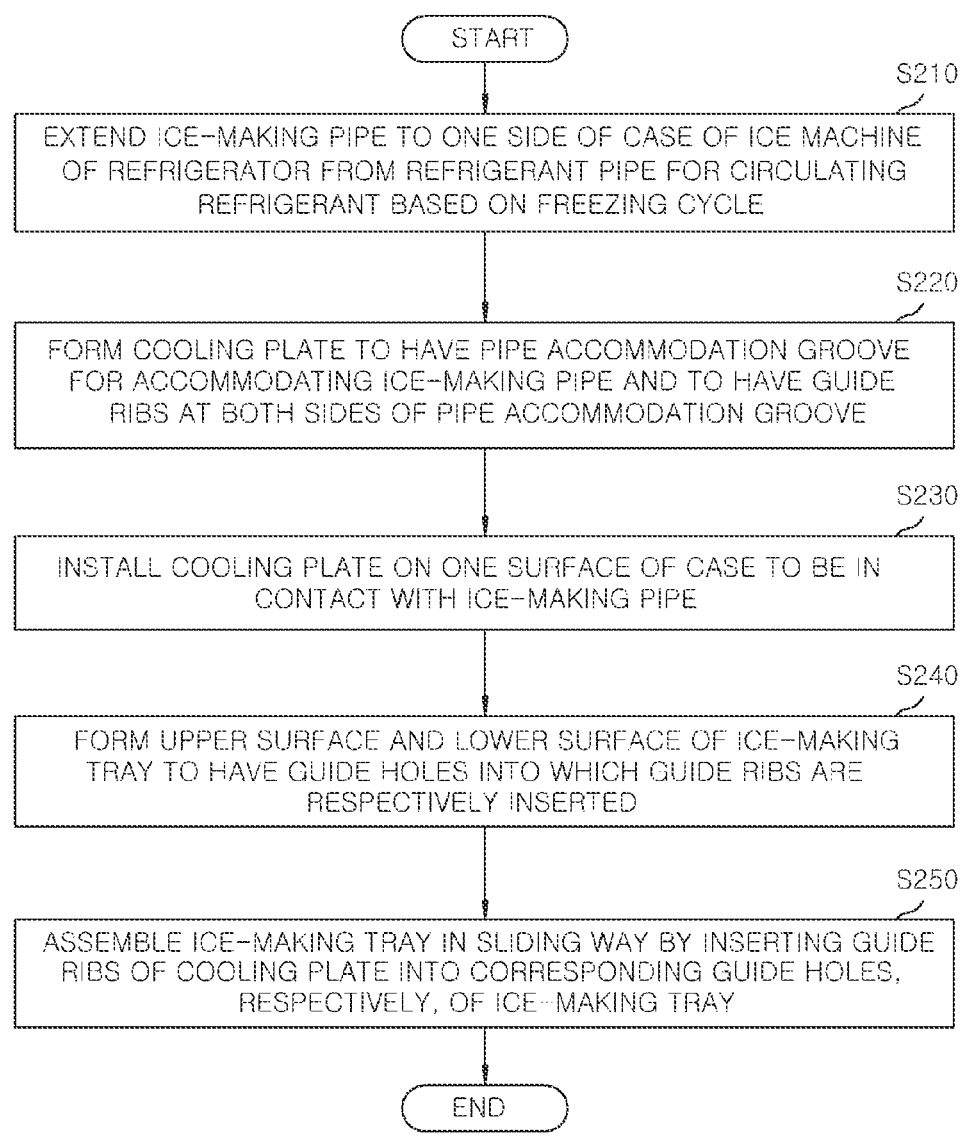
FIG. 4 is a flowchart showing a method for assembling an ice-making machine of the refrigerator in accordance with an embodiment of the present invention.

FIG. 4 is a flowchart showing a method for assembling the ice machine 10 of the refrigerator 1 in accordance with an embodiment of the present invention.

The method for assembling the ice machine of the refrigerator according to the embodiment shown in FIG. 4 includes: step S210 of extending the ice-making pipe 160 to one side of the case 110 of the ice machine 10 in the refrigerator from a refrigerant pipe 20 for circulating refrigerant that goes through a cooling/freezing cycle; step S220 of forming the cooling plate 140 to have the pipe accommodation groove 140a for accommodating the ice-making (cold air) pipe 160 and to have the guide ribs 140b at both sides of the pipe accommodation groove 140a; step S230 of installing the cooling plate 140 on one surface of the case, and installing the ice-making pipe 160 in the pipe accommodation groove 140a so as to be in contact with the cooling plate; step S240 of forming the upper surface 130a and lower surface 130b of the ice-making tray 130 to have guides 130c with which the guide ribs 140b are respectively engaged; and step S250 of inserting the guide ribs 140b of the cooling plate 140 into the corresponding guides 130c, respectively, of the ice-making tray 130, thereby installing the ice-making tray 130 in the ice machine in a sliding way.

In accordance with an embodiment of the present invention, a refrigerator having an improved ice-making speed and an increased amount of ice, and a method for assembling the ice machine of the refrigerator, are disclosed.

In addition, since the refrigerant pipe is disposed outside the ice-making space, the ice machine can be simplified, which simplifies manufacturing and improves productivity and reduces manufacturing costs.

In addition, since a compact ice machine is provided, the storage capacity of the refrigerator can increase.

In addition, since the ice-making pipe is disposed in the pipe accommodation groove of the cooling plate, and portions of the pipe accommodation groove are sealed with a sealing agent, cold air in the ice-making pipe is not lost to the outside and is transferred only to the cooling plate.

While the invention has been shown and described with respect to the disclosed embodiments, the present invention is not limited thereto. It will be understood by those skilled in the art that various changes and modifications may be made without departing from the scope of the invention as defined in the following claims.

What is claimed is:

1. A refrigerator comprising:
a main body configured to have a storage space for storing food;
a refrigerant pipe for circulating refrigerant; and
an ice machine in the storage space,
wherein the ice machine comprises:
a case comprising an ice-making space;
an ice-making pipe extending from the refrigerant pipe to the case;
a cooling plate on a surface of the case and configured to be in contact with the ice-making pipe; and
an ice-making tray on the cooling plate so as to be cooled by the cooling plate, and configured to accommodate water for generating ice,
wherein the cooling plate comprises a pipe accommodation groove for accommodating the ice-making pipe and guide ribs formed at both sides of the pipe accommodation groove, wherein the ice-making tray comprises guides on an upper surface and a lower surface thereof, and wherein the guide ribs of the cooling plate are respectively inserted into the guides of the ice-making tray and couple the ice-making tray and the cooling plate in a sliding manner.

2. The refrigerator of claim 1, wherein the ice-making tray is made of a material having high heat conductivity.

3. The refrigerator of claim 1, wherein the ice-making tray comprises a plurality of heat exchange ribs.

4. The refrigerator of claim 1, further comprising a heater part in a space between the upper surface and the lower surface of the ice-making tray.

5. The refrigerator of claim 1, wherein the pipe accommodation groove is sealed by a sealing agent.

6. A method for assembling an ice machine for a refrigerator, the method comprising: an ice-making pipe extending from a refrigerant pipe operable for circulating refrigerant to a case of the ice machine; forming a cooling plate to have a pipe accommodation groove for accommodating the ice-making pipe and to have guide ribs at both sides of the pipe accommodation groove; installing the cooling plate, which is in contact with the ice-making pipe and is cooled, on a surface of the case; assembling an ice-making tray, which accommodates water for generating ice, on the cooling plate; and forming an upper surface and a lower surface of the ice-making tray to have guides into which the guide ribs are respectively inserted, wherein said assembling comprises assembling the ice-making tray on the cooling plate so that the ice-making tray is slide-able.

7. The method of claim 6, further comprising sealing a portion of the pipe accommodation groove with a sealing agent.

\* \* \* \* \*